United States Patent
Henry et al.

(10) Patent No.: US 9,110,175 B2
(45) Date of Patent: Aug. 18, 2015

(54) COMPUTED RADIOGRAPHY IMAGING PLATES AND ASSOCIATED METHODS OF MANUFACTURE

(71) Applicants: Nathaniel F. Henry, Clinton, TN (US); Alex K. Moses, Knoxville, TN (US)

(72) Inventors: Nathaniel F. Henry, Clinton, TN (US); Alex K. Moses, Knoxville, TN (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/206,221

(22) Filed: Mar. 12, 2014

(65) Prior Publication Data

US 2014/0264083 A1 Sep. 18, 2014

Related U.S. Application Data

(60) Provisional application No. 61/786,749, filed on Mar. 15, 2013.

(51) Int. Cl.
| | |
|---|---|
| *G01J 1/58* | (2006.01) |
| *G01T 1/20* | (2006.01) |
| *G03B 42/02* | (2006.01) |
| *G21K 4/00* | (2006.01) |

(52) U.S. Cl.
CPC ............... *G01T 1/2012* (2013.01); *G03B 42/02* (2013.01); *G21K 2004/04* (2013.01); *G21K 2004/06* (2013.01)

(58) Field of Classification Search
CPC .. G21K 4/00; G21K 2004/06; G21K 2004/04
USPC ........................................................ 250/483.1
See application file for complete search history.

(56) References Cited

U.S. PATENT DOCUMENTS

| | | | |
|---|---|---|---|
| 4,712,011 A | 12/1987 | Van Leunen | |
| 6,339,224 B1* | 1/2002 | Takahara et al. ............ | 250/486.1 |
| 2002/0043627 A1* | 4/2002 | Bergh ......................... | 250/462.1 |
| 2003/0003312 A1* | 1/2003 | Aylward et al. ............... | 428/480 |
| 2008/0173824 A1* | 7/2008 | Sekiguchi et al. ........ | 250/370.11 |
| 2010/0034351 A1 | 2/2010 | Yanagita et al. | |

* cited by examiner

*Primary Examiner* — David Porta
*Assistant Examiner* — Hugh H Maupin
(74) *Attorney, Agent, or Firm* — Clements Bernard PLLC; Christopher L. Bernard; Lawrence A. Baratta, Jr.

(57) ABSTRACT

Computed radiography imaging plates incorporating an intensifying material that is coupled to or intermixed with the phosphor layer, allowing electrons and/or low energy x-rays to impart their energy on the phosphor layer, while decreasing internal scattering and increasing resolution. The radiation needed to perform radiography can also be reduced as a result.

15 Claims, 1 Drawing Sheet

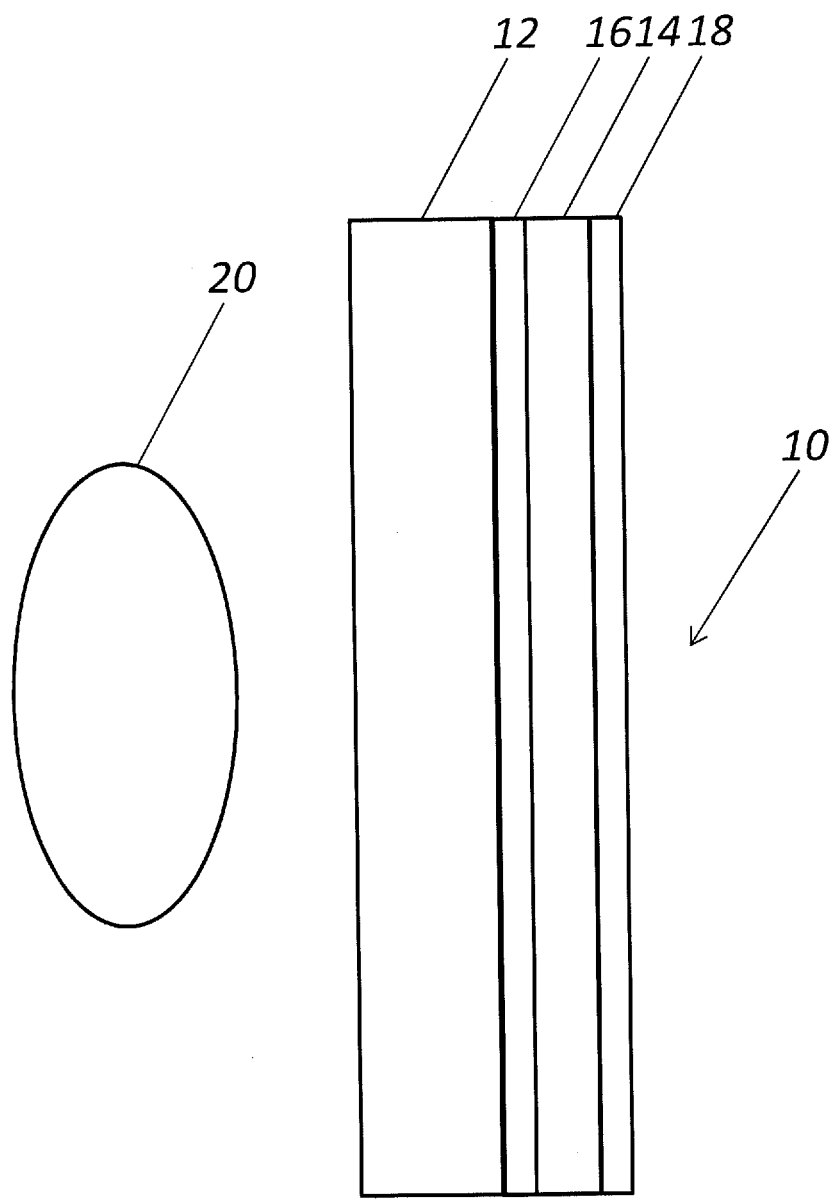

COMPUTED RADIOGRAPHY IMAGING PLATES AND ASSOCIATED METHODS OF MANUFACTURE

CROSS-REFERENCE TO RELATED APPLICATION

The present patent application/patent claims the benefit of priority of U.S. Provisional Patent Application No. 61/786,749, filed on Mar. 15, 2013, and entitled "COMPUTED RADIOGRAPHY IMAGING PLATES AND ASSOCIATED METHODS OF MANUFACTURE," the contents of which are incorporated in full by reference herein.

STATEMENT REGARDING FEDERALLY SPONSORED RESEARCH OR DEVELOPMENT

The U.S. Government has rights to the present disclosure pursuant to Contract No. AC05-00OR22800 between the U.S. Department of Energy and Babcock and Wilcox Technical Services Y-12, LLC.

FIELD OF THE DISCLOSURE

The present disclosure relates generally to the medical and industrial imaging fields. More specifically, the present disclosure relates to computed radiography (CR) imaging plates and associated methods of manufacture.

BACKGROUND OF THE DISCLOSURE

Computed radiography (CR) is a reusable digital radiography modality. It utilizes reusable imaging plates incorporating a relatively thin, flexible construction. These imaging plates include a photostimulable phosphor layer, which converts radiation into a latent image. This image is retrieved using a laser-catalyzed photoemission phosphor layer. A CR scan produces a digital image. The imaging plate is erased with light to remove any remaining latent image that was not retrieved by the laser, thereby allowing the imaging plate to be reused. From a technician's standpoint, there is little difference between film and CR radiography, and general handling and use precautions are very similar, the biggest differences being related to the operation of the CR scanner, as opposed to the film processor.

Much of the advancement of radiographic technologies comes from the medical sector. Industrial non-destructive testing (NDT) markets are significantly smaller. The medical sector primarily uses energies of in the range of about 25-150 KeV for imaging. Advancements in the medical sector's technologies, equipment, and protocols emphasize lowering the radiation received by a patient undergoing a given test.

Most conventional imaging plates are constructed in a similar manner, and the following is not an exhaustive list of construction options, but covers the basic construction and functionality of the major layers. Starting from the back of the imaging plate and moving to the front (i.e., source side), the imaging plate includes:

A backing layer that provides structural support. This backing layer is relatively thick and made of plastic or the like.

A group of layers designed to reflect some wavelengths of light, but not others; in most plate constructions, the light emitted by the phosphor layer is reflected to decrease dose to the patient with only an acceptable sacrifice of resolution. Imaging plates designed for higher resolutions can be specifically designed to not reflect light emitted by the phosphor layer. Most imaging plates can be designed to not reflect light from the laser used to stimulate the phosphor layers.

The phosphor layer that reacts with x-rays to produce a latent image. The phosphor layer releases light in proportion to the radiation absorbed when stimulated by a laser.

A clear plastic protective layer used to protect the phosphor layer yet allow light to enter and leave the imaging plate. This layer is normally thinner on higher resolution plates.

Binding layers may also be present between other layers. The imaging plates are built by or for film manufacturers and have a very similar construction to film. However, film does not have the reflective/antireflective layers, and film replaces the phosphor layer with a layer of light and x-ray sensitive silver salts.

Commercially available CR imaging plates are optimized for use in the KeV energy range. The typical setup for CR is as follows.

The imaging plate is placed inside a light-tight container, typically a film/CR cassette or sleeve, where the test object itself can serve as the light-tight container, or the x-ray area can be darkened.

Between the object and the source, a collimator(s) can be used to lessen the effect of scatter by decreasing the size of the primary beam.

At the source, some filtration can be used to preferentially remove lower energy radiation from the primary beam, decreasing scatter and effectively increasing the average energy of the primary x-ray beam.

In medical radiography, great care is taken to minimize patient radiation exposure, and reduced radiation exposure is one focus of the present disclosure.

U.S. Pat. No. 4,712,011 is related to the present disclosure: An X-ray image intensifier tube which includes a luminescent layer with an absorption material having a high absorption for secondary X-rays which are generated in the original luminescent material and which are intercepted to only a very small extent by the original luminescent material. The absorption material may be included in the layer of luminescent material in homogeneous form as well as in recesses in said layer. In addition to improved resolution, a higher efficiency can be achieved by ensuring that, upon interception of the secondary radiation, the absorption material generates luminescent or secondary radiation which is intercepted by the original luminescent material.

U.S. Patent Application Publication No. 2010/0034351 is also related to the present disclosure: Disclosed are a radiation image conversion panel, which provides high luminance, an image without white or black defects, an image free from cracks and an image with reduced unevenness, and its manufacturing method. Also disclosed is an X-ray radiographic system employing the radiation image conversion panel. The radiation image conversion panel of the invention comprises a substrate and provided thereon, a reflection layer, a phosphor layer and a protective layer in that order, wherein the phosphor layer is composed of a phosphor crystal in the form of a column, and the reflection layer is formed by vapor phase deposition of two or more kinds of metals.

BRIEF SUMMARY OF THE DISCLOSURE

In the present disclosure, a novel screen (also referred to herein as a layer, filter, grid, and/or intensifier) is coupled to the phosphor layer, allowing electrons and/or low energy x-rays to impart their energy on the phosphor layer, while decreasing internal scattering and increasing resolution. The radiation dose needed to perform radiography can also be reduced as a result.

Thus, the present disclosure provides a novel process for manufacturing and design of a CR imaging plate that provides significant improvement in resolution for CR systems. This design incorporates a metallic screen or other metallic structure as the phosphor layer's substrate backing, as opposed to a conventional plastic substrate. This design places the phosphor layer in intimate contact with the intensifying screen. As an added advantage, the metallic substrate can be designed to act as a secondary scatter filter for the phosphor layer. A second, and potentially mutually non-exclusive, mechanism for accomplishing intensification (i.e., resolution enhancement/exposure reduction) is to intersperse finely divided metal or metallic compounds into the phosphor layer to achieve the intensification at the grain level of the phosphor.

Previous to the present disclosure, the conventional plastic substrate on commercially-available products has its own luminescence that interferes with the images. This problem is especially apparent in higher-energy x-ray applications. With current imaging plate designs, the use of intensifying screens is extremely difficult due to proximity limitations inherent in the current imaging plate designs, which incorporate a poly substrate on one side of the phosphor layer with a protective coating on the other side of the phosphor layer, thereby preventing the proper placement of such intensifying screens. With the use of intensifiers, as in the present disclosure, and with an increase in resolution, there is the potential to greatly reduce specimen exposure in low-energy (medical) x-ray operations, for example.

In one exemplary embodiment, the present disclosure provides an imaging plate for use in radiography applications, including: a phosphor layer; and a metallic or metallic compound intensifying layer coupled to the phosphor layer. Optionally, the imaging plate also includes one of a reflective layer or an anti-reflective layer disposed between the phosphor layer and the metallic or metallic compound intensifying layer. Optionally, the imaging plate further includes a clear protective layer coupled to the phosphor layer opposite the metallic or metallic compound intensifying layer. Optionally, the imaging plate still further includes a structural support layer. Optionally, the imaging plate still further includes one or more binding layers. Preferably, the metallic or metallic compound intensifying layer primarily includes a metal or metal alloy—one or more of lead, copper, tungsten, tantalum, steel, stainless steel, brass, aluminum, nickel, cobalt, silver, gold, platinum, osmium, ruthenium, niobium, hafnium, zinc, cadmium, bismuth, tin, iridium, molybdenum, manganese, titanium, vanadium, scandium, thorium, and uranium.

In another exemplary embodiment, the present disclosure provides an imaging plate for use in radiography applications, including: a phosphor layer; and a plurality of metallic or metallic compound intensifying particles disposed one or more of on a surface of and within an interior portion of the phosphor layer. Optionally, the imaging plate also includes one of a reflective layer or an anti-reflective layer disposed between the phosphor layer and the metallic or metallic compound intensifying particles. Optionally, the imaging plate further includes a clear protective layer coupled to the phosphor layer opposite the metallic or metallic compound intensifying particles. Optionally, the imaging plate still further includes a structural support layer. Optionally, the imaging plate still further includes one or more binding layers. Preferably, the metallic or metallic compound intensifying particles primarily include a metal or metal alloy—one or more of lead, copper, tungsten, tantalum, steel, stainless steel, brass, aluminum, nickel, cobalt, silver, gold, platinum, osmium, ruthenium, niobium, hafnium, zinc, cadmium, bismuth, tin, iridium, molybdenum, manganese, titanium, vanadium, scandium, thorium, and uranium. Optionally, the phosphor layer is coated or doped with the metallic or metallic compound intensifying particles.

BRIEF DESCRIPTION OF THE DRAWING

The present disclosure is illustrated and described herein with reference to the drawing, in which:

FIG. 1 is a schematic diagram illustrating one exemplary embodiment of the CR imaging plate of the present disclosure.

DETAILED DESCRIPTION OF THE DISCLOSURE

Referring specifically to FIG. 1, in one exemplary embodiment of the CR imaging plate 10 of the present disclosure, a metallic or other similar high density material layer 12 (also referred to herein as the intensifying layer 12) is coupled to the phosphor layer 14. Reflective or anti-reflective layers or surfacing 16 optionally may be disposed between the intensifying layer 12 and the phosphor layer 14, depending on desired use of the imaging plate 10. The thickness and material composition of the intensifying layer 12 will affect the effective quantum efficiency of the detector (not illustrated) and change the dose response curves and the effective resolution. Different thicknesses and material compositions of the intensifying layer 12 will be better suited for different energies of x-rays and applications.

The conventional backing layer (not illustrated) may be able to be removed and its construction is less vital to the present disclosure. It may still be needed to provide backing if a sufficiently thin or otherwise structurally unsound or non-robust intensifying layer 12 is used. Since it is no longer being used to provide a mounting surface for the phosphor layer 14, the options available for the backing layer's construction are greater, and carbon fiber composites or other fibrous or non-fibrous materials may provide a more optimal backing than previously possible.

The clear protective layer 18 remains roughly the same as in conventional applications, and serves the same purposes. Typically, in conventional CR plate designs, the clear protective layer 18 is the first layer that the radiation beam encounters. In the present disclosure, however, it could be the first layer or the last layer, depending upon the optimization required.

Binding layers (not illustrated) may be present between other layers. Depending upon the construction chosen, some sealant around the imaging plate 10 may be necessary to maintain water/moisture tightness around the phosphor layer 14. A layer or other features to facilitate imaging plate handling by radiographers or the CR scanner are not strictly needed, but may improve performance and/or usability. Increases to resolution and decreases to radiation exposure (i.e., dose) are the outcome of the use of the imaging plate 10 of the present disclosure.

The imaging plate 10 of the present disclosure is radiographed with the intensifying layer 12 typically towards the object being imaged 20. The clear protective coating 18 is facing the laser beam during scanning. The advantages of the imaging plate 10 of the present disclosure include better portability, better efficiency, and better resolution. It should be noted that, as used herein, "layer" may also refer to a layer, a coating, or any other comparable structure.

Thus, stated differently, the present disclosure affixes the phosphor (active) layer 14 of the plate 10 to a metallic substrate 12, as opposed to a conventional polymer substrate. By eliminating the polymer substrate, the present disclosure eliminates all florescence and adverse secondary energy deposition into the phosphor layer 14 emanating from within the polymer substrate. Such image interferences are common with the use of polymer substrates. This action is observed more at higher primary energy sources. By reducing the interference from the polymer substrate, the present disclosure is able to achieve both a higher contrast-to-noise ratio and a better modulation transfer function, while reducing specimen exposure.

With the phosphor layer 14 in intimate contact with the metallic substrate layer 12, there will be an efficient and coherent interaction of secondary energy emanating from the metallic substrate layer 12 and being deposited in the phosphor layer 14. The structure of the phosphor layer 14 and the metallic substrate layer 12 could be formed by vapor deposition, electroplating, a mechanical coating process, a mechanical process (i.e. a vacuum/presser/clamping process), a chemical bonding process, and/or the like, depending upon final plate usage requirements. The size and shape of the phosphor micro structure can be modified to fit the final usage requirements.

The metallic substrate 12 performs the following functions, depending on material and material thickness. It provides a durable backing material that protects the phosphor layer 14 from mechanical damage. It provides a strong substrate that maintains order and coherence of the phosphor layer 14. A notable function is to provide an intensifying screen for the phosphor layer 14 that increases efficiency of the phosphor (active) layer 14, such that a lower level of primary beam exposure to an object can be used to achieve an equivalent or better image resolution. This can be used in the medical field to achieve lower patient exposure levels for equivalent image qualities. This metallic intensifying media 12 can also be combined with the phosphor layer 14 as a finely divided metal or metallic compound, for example. In this granular embodiment, the metallic intensifying media 12 can be modified to be a doping agent for the phosphor layer 14 to alter and optimize the efficiency of the phosphor layer 14. This allows for optimization of the imaging plate 10 for a given application. A secondary function of the metallic substrate 12 is to be an energy filter, or X-ray beam hardener. Another function of the metallic substrate 12 is to absorb secondary scatter radiation, mostly emanating from the specimen 20. Variance in the material used in the metallic substrate 12 changes the quantum efficiency of the phosphor layer 14 by changing the energy and abundance of the secondary energy emanating from the metallic substrate 12 and being deposited in the phosphor layer 14. The metal substrate thickness can be modified to also act as a low energy (scatter radiation) filter for the phosphor layer 14 to increase the signal-to-noise ratio, thus improving the image quality. The thickness of the metallic substrate 12 is dependent on the energies utilized and the amount of intensification desired, as well as the scatter absorption desired. For designs where the intensifying substrate thickness requirements are too thin to provide a robust enough backing for the phosphor layer 14, the intensifying substrate 12 can be plated or bonded to a separate substrate (not illustrated) for strength. This strengthening substrate can be an ordered or non-ordered fibrous backing or some other design. Some of the metals that have been used as the metallic substrate 12 include: lead, copper, tungsten, and tantalum. This does not preclude the option of using any metallic alloy, steel, stainless steel, brass, aluminum, nickel, cobalt, silver, gold, platinum, osmium, ruthenium, niobium, hafnium, zinc, cadmium, bismuth, tin, iridium, molybdenum, manganese, titanium, vanadium, scandium, thorium, or uranium, for example.

Again, there can be a visible light barrier 16 that is also non-reflective between the substrate 12 and the phosphor layer 14. This light barrier's thickness and material will depend upon several factors. Some of these factors include, but are not limited to, the following: primary energy used, metal substrate material and alloy, metal substrate thickness, phosphor composition, phosphor layer construction, specimen material, and specimen construction. This visible light barrier 16 is tuned to absorb the light wavelength of the excitation laser, while either reflecting or absorbing the wavelength of the light emitted by the phosphor layer 14. If specimen exposure is of concern, then a visible light barrier 16 that reflects the light emitted by the phosphor layer 14 is utilized. If maximum resolution is desired, then a visible light barrier 16 that absorbs the light emitted from the phosphor layer 14 is utilized.

Although the present disclosure has been illustrated and described herein with reference to preferred embodiments and specific examples thereof, it will be appreciated by those of ordinary skill in the art that other embodiments and examples may perform similar functions and/or achieve like results. All such equivalent embodiments and examples are within the spirit and scope of the present disclosure, are contemplated thereby, and are intended to be covered by the following claims, which should be given the benefit of all reasonable equivalents.

What is claimed is:

1. An imaging plate for use in radiography applications, comprising:
   a phosphor layer;
   a metallic or metallic compound intensifying layer coupled to the phosphor layer; and
   a visible light barrier disposed between the phosphor layer and the metallic or metallic compound intensifying layer;
   wherein the metallic or metallic compound intensifying layer is coupled to a side of the phosphor layer that is configured to be disposed proximate to an object to be imaged when the imaging plate is in use.

2. The imaging plate of claim 1, wherein the visible light barrier comprises one of a reflective layer or an anti-reflective layer disposed between the phosphor layer and the metallic or metallic compound intensifying layer.

3. The imaging plate of claim 1, further comprising a clear protective layer coupled to the phosphor layer opposite the metallic or metallic compound intensifying layer.

4. The imaging plate of claim 1, further comprising a structural support layer.

5. The imaging plate of claim 1, further comprising one or more binding layers.

6. The imaging plate of claim 1, wherein the metallic or metallic compound intensifying layer primarily comprises a metal.

7. The imaging plate of claim 6, wherein the metallic or metallic compound intensifying layer comprises one or more of lead, copper, tungsten, tantalum, steel, stainless steel, brass, aluminum, nickel, cobalt, silver, gold, platinum, osmium, ruthenium, niobium, hafnium, zinc, cadmium, bismuth, tin, iridium, molybdenum, manganese, titanium, vanadium, scandium, thorium, and uranium.

8. An imaging plate for use in radiography applications, comprising:
   a phosphor layer;

a plurality of metallic or metallic compound intensifying particles disposed one or more of on a surface of and within an interior portion of the phosphor layer; and a visible light barrier disposed between the phosphor layer and the plurality of metallic or metallic compound intensifying particles;

wherein the plurality of metallic or metallic compound intensifying particles are disposed at least partially between the phosphor layer and an object to be imaged when the imaging plate is in use.

9. The imaging plate of claim 8, wherein the visible light barrier comprises one of a reflective layer or an anti-reflective layer disposed between the phosphor layer and the metallic or metallic compound intensifying particles.

10. The imaging plate of claim 8, further comprising a clear protective layer coupled to the phosphor layer opposite the metallic or metallic compound intensifying particles.

11. The imaging plate of claim 8, further comprising a structural support layer.

12. The imaging plate of claim 8, further comprising one or more binding layers.

13. The imaging plate of claim 8, wherein the metallic or metallic compound intensifying particles primarily comprise a metal.

14. The imaging plate of claim 13, wherein the metallic or metallic compound intensifying particles comprise one or more of lead, copper, tungsten, tantalum, steel, stainless steel, brass, aluminum, nickel, cobalt, silver, gold, platinum, osmium, ruthenium, niobium, hafnium, zinc, cadmium, bismuth, tin, iridium, molybdenum, manganese, titanium, vanadium, scandium, thorium, and uranium.

15. The imaging plate of claim 8, wherein the phosphor layer is one of coated and doped with the metallic or metallic compound intensifying particles.

* * * * *

UNITED STATES PATENT AND TRADEMARK OFFICE
CERTIFICATE OF CORRECTION

PATENT NO. : 9,110,175 B2  
APPLICATION NO. : 14/206221  
DATED : August 18, 2015  
INVENTOR(S) : Nathaniel F. Henry et al.

Page 1 of 1

It is certified that error appears in the above-identified patent and that said Letters Patent is hereby corrected as shown below:

On The Title Page, Item (73) Assignee should read

--Consolidated Nuclear Security, LLC, Reston, VA--

Signed and Sealed this  
Twenty-ninth Day of December, 2015

Michelle K. Lee  
*Director of the United States Patent and Trademark Office*